(12) United States Patent
Owen et al.

(10) Patent No.: US 12,321,692 B2
(45) Date of Patent: Jun. 3, 2025

(54) ANNOTATING DATA POINTS ON A WORKBOOK ELEMENT

(71) Applicant: SIGMA COMPUTING, INC., San Francisco, CA (US)

(72) Inventors: Gregory G. Owen, San Mateo, CA (US); Stipo Josipovic, San Francisco, CA (US)

(73) Assignee: SIGMA COMPUTING, INC., San Francisco, CA (US)

(*) Notice: Subject to any disclaimer, the term of this patent is extended or adjusted under 35 U.S.C. 154(b) by 0 days.

(21) Appl. No.: 18/189,089

(22) Filed: Mar. 23, 2023

(65) Prior Publication Data
US 2024/0320415 A1    Sep. 26, 2024

(51) Int. Cl.
G06F 16/00   (2019.01)
G06F 16/25   (2019.01)
G06F 40/169  (2020.01)
G06F 40/18   (2020.01)

(52) U.S. Cl.
CPC .......... *G06F 40/169* (2020.01); *G06F 16/254* (2019.01); *G06F 40/18* (2020.01)

(58) Field of Classification Search
CPC ...... G06F 40/169; G06F 16/254; G06F 40/18; G06F 16/235; G06F 16/283; G06F 16/248
See application file for complete search history.

(56) References Cited

U.S. PATENT DOCUMENTS

| | | | |
|---|---|---|---|
| 8,667,385 B1 | 3/2014 | Mui et al. | |
| 11,113,294 B1* | 9/2021 | Bourbie | G06F 16/24568 |
| 11,216,511 B1* | 1/2022 | Bigdelu | G06F 16/248 |
| 11,573,971 B1* | 2/2023 | Cannon | G06F 16/252 |
| 2004/0267798 A1 | 12/2004 | Chatterjee et al. | |
| 2009/0144313 A1 | 6/2009 | Hodge et al. | |
| 2017/0193535 A1* | 7/2017 | Xu | H04L 67/1017 |
| 2018/0096039 A1 | 4/2018 | Otaguro et al. | |
| 2019/0205453 A1 | 7/2019 | Miller et al. | |
| 2022/0335212 A1 | 10/2022 | Frantz et al. | |

FOREIGN PATENT DOCUMENTS

EP   1622045 A2   2/2006

OTHER PUBLICATIONS

International Search Report and Written Opinion, PCT/US2024/020744, Jul. 18, 2024, 10 pages.

* cited by examiner

*Primary Examiner* — Dinku W Gebresenbet

(57) ABSTRACT

Annotating data points on a workbook element, including: receiving, by a workbook manager from a client computing system, an annotation for a data point of an element of a workbook, wherein the workbook presents a dataset from a cloud-based data warehouse; and storing, by the workbook manager and into the cloud-based data warehouse, the annotation in association with a record in the dataset corresponding to the data point.

15 Claims, 6 Drawing Sheets

ANNOTATING DATA POINTS ON A WORKBOOK ELEMENT

BACKGROUND

Field of the Invention

The field of the invention is data processing, or, more specifically, methods, apparatus, and products for annotating data points on a workbook element.

Description of Related Art

Modern businesses may store large amounts of data in remote databases within cloud-based data warehouses. This data may be accessed using database statement languages, such as structured query language (SQL). Manipulating the data stored in the database may require constructing complex queries beyond the abilities of most users. Further, composing and issuing database queries efficiently may also be beyond the abilities of most users.

SUMMARY

Methods, systems, and apparatus for annotating data points on a workbook element including receiving, by a workbook manager from a client computing system, an annotation for a data point of an element of a workbook, wherein the workbook presents a dataset from a cloud-based data warehouse; and storing, by the workbook manager and into the cloud-based data warehouse, the annotation in association with a record in the dataset corresponding to the data point.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
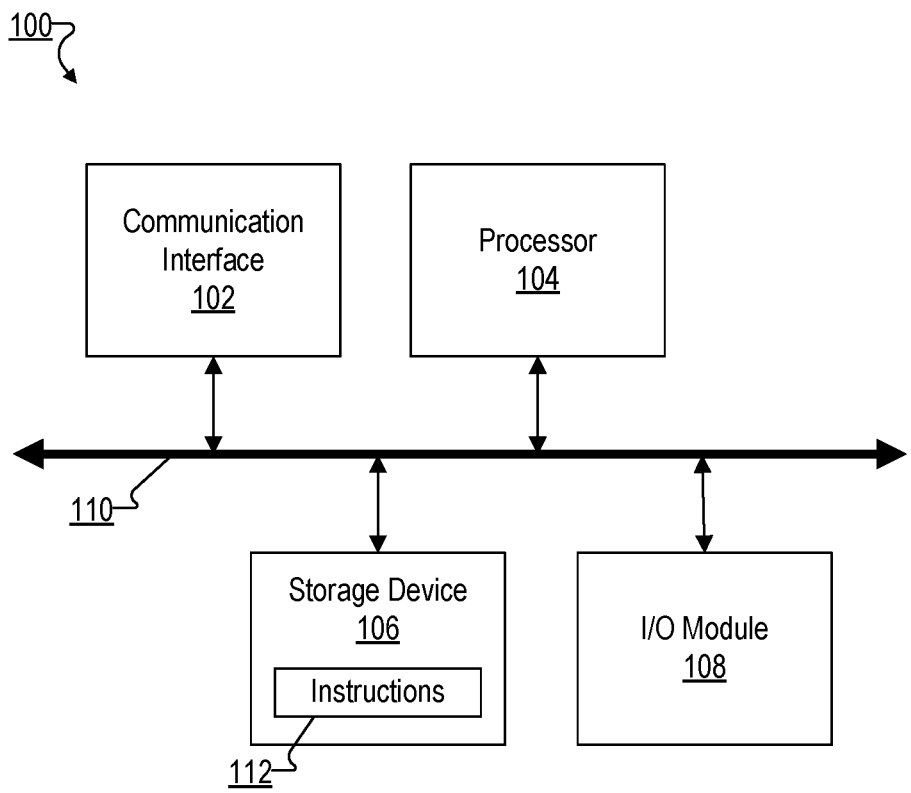
FIG. 1 sets forth a block diagram of an example system configured for annotating data points on a workbook element according to embodiments of the present invention.

Example methods, apparatus, and products for annotating data points on a workbook element in accordance with embodiments of the present disclosure are described with reference to the accompanying drawings, beginning with FIG. 1. FIG. 1 illustrates an exemplary computing device 100 that may be specifically configured to perform one or more of the processes described herein. As shown in FIG. 1, computing device 100 may include a communication interface 102, a processor 104, a storage device 106, and an input/output ("I/O") module 108 communicatively connected one to another via a communication infrastructure 110. While an exemplary computing device 100 is shown in FIG. 1, the components illustrated in FIG. 1 are not intended to be limiting. Additional or alternative components may be used in other embodiments. Components of computing device 100 shown in FIG. 1 will now be described in additional detail.

Communication interface 102 may be configured to communicate with one or more computing devices. Examples of communication interface 102 include, without limitation, a wired network interface (such as a network interface card), a wireless network interface (such as a wireless network interface card), a modem, an audio/video connection, and any other suitable interface.

Processor 104 generally represents any type or form of processing unit capable of processing data and/or interpreting, executing, and/or directing execution of one or more of the instructions, processes, and/or operations described herein. Processor 104 may perform operations by executing computer-executable instructions 112 (e.g., an application, software, code, and/or other executable data instance) stored in storage device 106.

Storage device 106 may include one or more data storage media, devices, or configurations and may employ any type, form, and combination of data storage media and/or device. For example, storage device 106 may include, but is not limited to, any combination of non-volatile media and/or volatile media. Electronic data, including data described herein, may be temporarily and/or permanently stored in storage device 106. For example, data representative of computer-executable instructions 112 configured to direct processor 104 to perform any of the operations described herein may be stored within storage device 106. In some examples, data may be arranged in one or more databases residing within storage device 106.

I/O module 108 may include one or more I/O modules configured to receive user input and provide user output. I/O module 108 may include any hardware, firmware, software, or combination thereof supportive of input and output capabilities. For example, I/O module 108 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 108 is configured to provide graphical data to a display for presentation to a user. The graphical data may be representative of one or more graphical user interfaces and/or any other graphical content as may serve a particular implementation. In some examples, any of the systems, computing devices, and/or other components described herein may be implemented by computing device 100.

Figure 2:
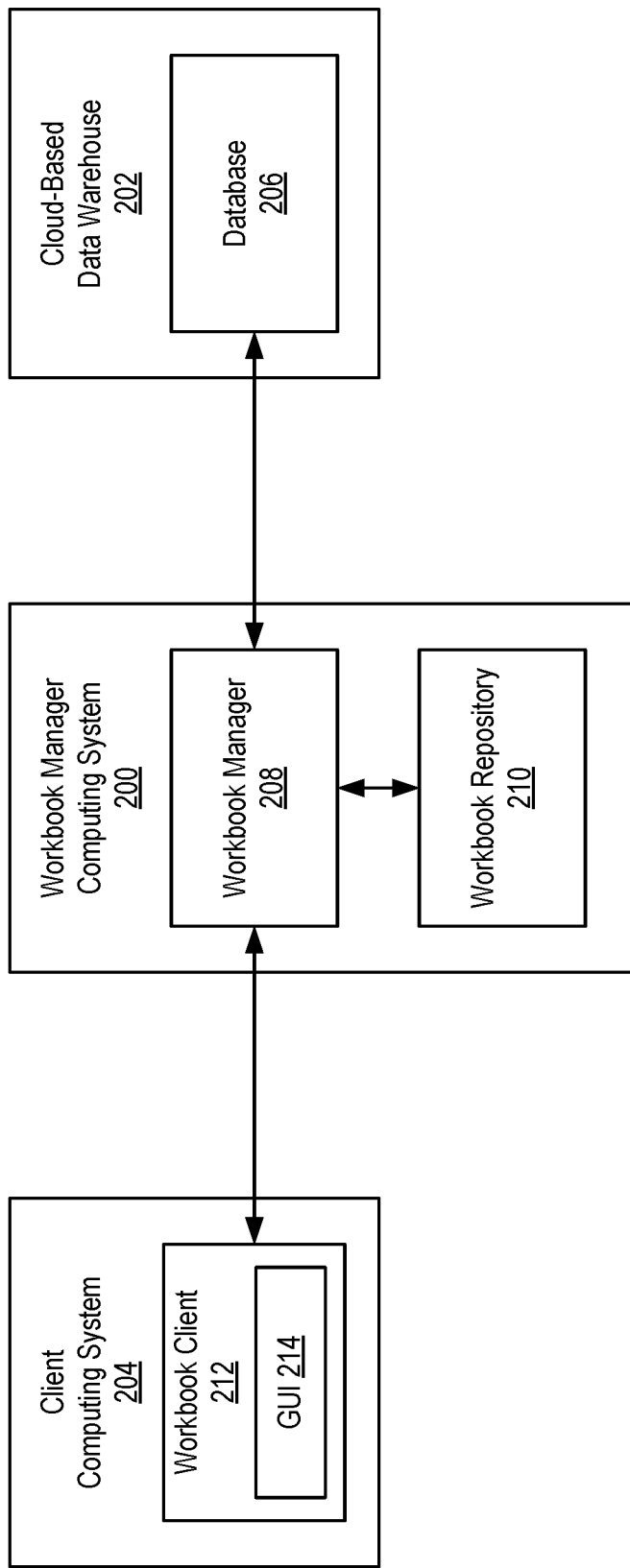
FIG. 2 sets forth a block diagram of an example system configured for annotating data points on a workbook element according to embodiments of the present invention.

For further explanation, FIG. 2 illustrates a block diagram depicting an exemplary system for annotating data points on a workbook element according to embodiments of the present invention. As shown in FIG. 2, the system includes a workbook manager computing system 200, a cloud-based data warehouse 202, and a client computing system 204. The workbook manager computing system 200 includes a workbook manager 208 and a workbook repository 210. The client computing system 204 includes a workbook client 212 with a graphical user interface (GUI) 214. The cloud-based data warehouse 202 includes a database 206.

The workbook manager 208 is hardware, software, or an aggregation of hardware and software configured to present a dataset within a workbook on a client computing system 204 via the workbook client 212. The workbook manager 208 uses the dataset to retrieve data from the database 206 by issuing a database statement to the cloud-based data warehouse 202 requesting the data. In response, the cloud-based data warehouse 202 sends query results including the data to the workbook manager 208. Once the query results are received, the data is then organized according to the dataset and workbook metadata to generate the workbook. The workbook is then sent to a workbook client 212 on the client computing system 204 for presentation to a client. The workbook manager 208 may reside on the workbook manager computing system 200, which is an intermediary computing system between each client computing system and the cloud-based data warehouse 202.

The cloud-based data warehouse 202 stores and manages client data on behalf of the client. The client (e.g., via the client computing system 204) accesses the data via the workbook manager 208, which organizes and analyzes the data as datasets within a workbook. The workbook manager 208 may access the client data from the cloud-based data warehouse 202 using credentials supplied by the client.

A workbook is a presentation of data from a cloud-based data warehouse 202 (e.g., using one or workbook elements). To present data from the cloud-based data warehouse 202, the data is retrieved from the database 206 (e.g., using a database statement) and organized using a dataset. A dataset is a collection of information that resides on the workbook manager computing system 200 that includes instructions for the retrieval and organization of data from the cloud-based data warehouse 202. The dataset may include, for example, a network location of the cloud-based data warehouse 202, a structure in which to organize the data, and formulas or other data points to be included with the data. When the workbook is being presented, the dataset also includes the data retrieved from the cloud-based data warehouse. A workbook may include one or more workbook elements. Each workbook element includes a collection of graphical elements and organizing mechanism for a dataset or portion of a dataset. Workbooks may be stored in the workbook repository 210. Workbooks are described in further detail below.

The workbook client 212 is a part of the workbook manager 208 and works in concert with the workbook manager 208 to present a workbook on a client computing system 204. The workbook client 212 may perform local processing of changes made to the workbook and/or the dataset. The workbook client 212 may be an application executing within a web browser. The workbook client 212 may be part of an Internet application that includes the workbook manager 208 and is hosted on the workbook manager computing system 200.

The GUI 214 is a visual presentation configured to present workbooks to a client. The GUI 214 may present a mechanism by which a user can manipulate and effect change to the workbook in the form of a workbook edit. The GUI 214 may be displayed on client computing system 204 (e.g., on a system display or mobile touchscreen).

The database 206 is a collection of data and a management system for the data. Data may be organized into columns and rows (also referred to as records). The particular columns, rows, and organization of the columns and rows that make up data may be specified in the database statement requesting the data. Data may be sent from the cloud-based data warehouse 202 in response to a database statement (also referred to as a query). Accordingly, data retrieved in response to a database statement may be referred to as query results. The database statement may be a structured query language statement.

The workbook manager 208 and workbook clients 212a, 212b may exchange information using state specifications. A state specification is a collection of data describing inputs into the GUI 214. The state specification may include manipulations of GUI elements within the GUI 214 along with data entered into the GUI 214 by a user of the client computing system 204. Such manipulations and data may indicate requests for and manipulations of data and or workbooks. Such manipulations and data may also indicate requests to edit an existing row or create a new row and values for that row. The state specification may be a standard file format used to exchange data in asynchronous browser-server communication. For example, the state specification may be a JavaScript Object Notation specification. The state specification may also include descriptions of elements that are used to apply changes to the data and/or workbooks. Such elements may include filters applied to an element of the workbook, the hierarchical level of an element of the workbook, joins performed within an element of the workbook, exposable parameters in an element of the workbook, and security for the workbook.

The workbook manager 208 may use the state specification as input to compile a database statement. This database statement generation process may include a number of intermediate forms. For example, the database statement generation process may begin with state specification being converted into an abstract syntax tree. The abstract syntax tree may then be canonicalized into a canonicalized hierarchy. The canonicalized hierarchy may then be linearized into the workbook algebra. The workbook algebra may then be lowered into a relational algebra, which may then be lowered into the database statement.

Figure 3:
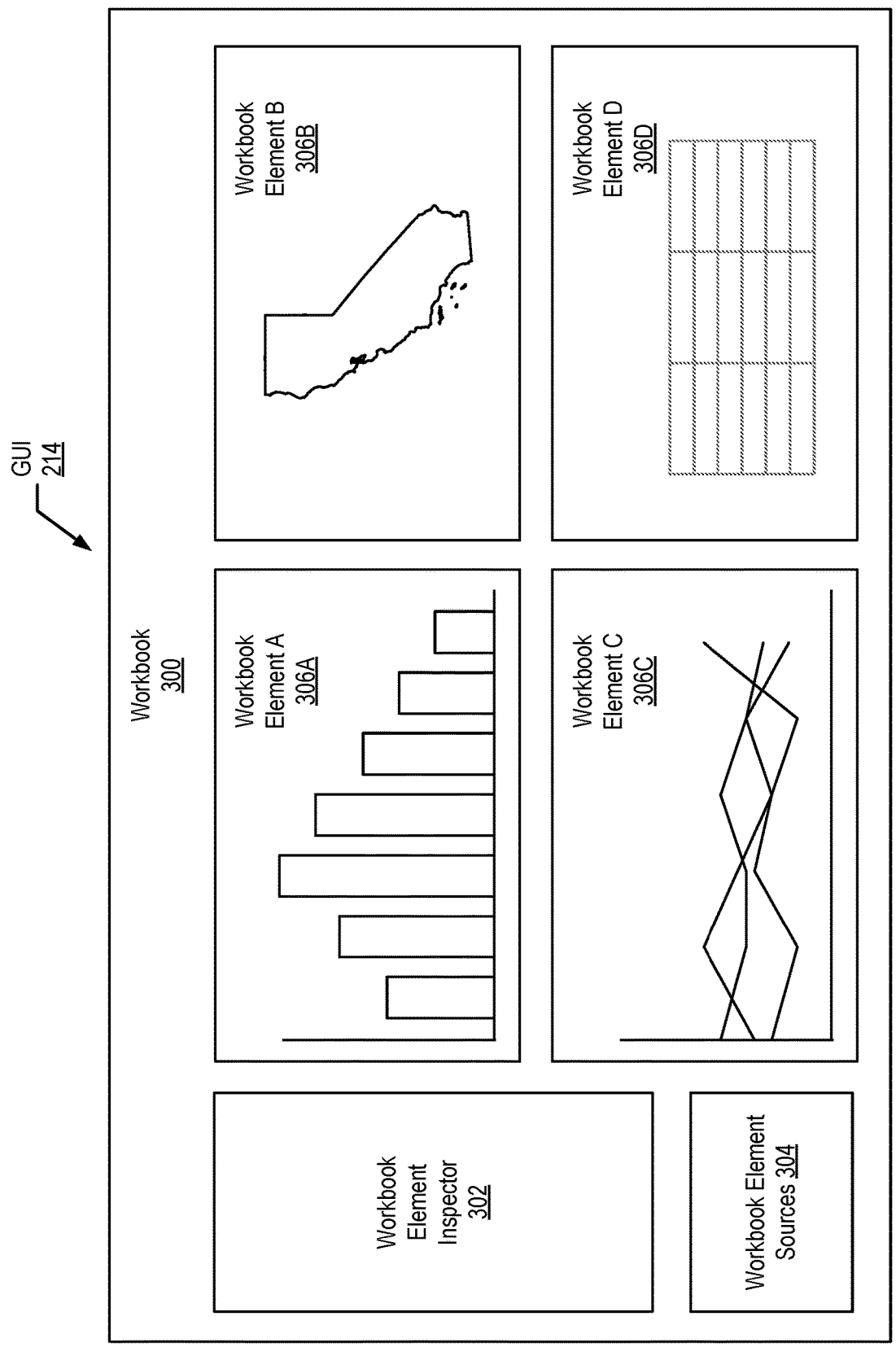
FIG. 3 sets forth a block diagram of an example system configured for annotating data points on a workbook element according to embodiments of the present invention.

FIG. 3 shows an exemplary GUI for annotating data points on a workbook element according to embodiments of the present invention. As shown in FIG. 3, the exemplary GUI 214 includes a workbook 300. The workbook 302 includes a workbook element inspector 302, workbook element sources 304, and four workbook elements (workbook element A 306A, workbook element B 306B, workbook element C 306C, workbook element D 306D).

The workbook 300 is a collection of graphical elements and organizing mechanism for a dataset. The workbook may present a dataset with data retrieved by the workbook manager from a cloud-based data warehouse. The dataset may then be organized based on the workbook metadata retrieved from the workbook repository. As shown in FIG. 3, the workbook 300 includes four workbook elements. Workbook element A 306A presents a bar graph, workbook element B 306B presents a map, workbook element C 306C presents a line graph, and workbook element D 306D presents a spreadsheet structure. Other types of workbook elements exist beyond the examples shown in FIG. 3. Some workbook elements (such as workbook element A 306A, workbook element B 306B, and workbook element C 306C) are visualizations. Visualizations are graphical element that convey relationships between data in the dataset. Visualizations may include, for example, graphs, charts, or maps. Spreadsheet structures are a presentation of a dataset (such as a table) from a database on a cloud-based data warehouse. The spreadsheet structure displays rows of data organized by columns. The columns delineate different categories of the data in each row. One or more columns may be calculation columns that include calculation results using other columns in the spreadsheet structure based on a formula received from the client. Both visualizations and the spreadsheet structures may include dynamic elements and be configured to interact with a client using the client computing system 204 via the GUI 214. Each workbook element (workbook element A 306A, workbook element B 306B, workbook element C 306C, workbook element D 306D) may use a dataset unique to that workbook element or use a dataset shared by at least one other workbook element.

The workbook element inspector 302 is a mechanism by which a user may configure each workbook element. Specifically, the workbook element inspector 302 allows a user to bind dimensions of the dataset to channels of the workbook element. A dimension of the dataset refers to a group of values, rows, or columns that share a characteristic. For example, a dimension may be all values in the dataset from a particular column, all rows in the dataset that share a value for a particular column, all columns in the dataset that share a value for a particular row, etc. A channel of the workbook element 304, 306 refers to aspect of the workbook element that is assignable to a dimension. Channels of a spreadsheet structure may include columns or rows (e.g., a column of the dataset may be bound to a particular column location within the visual presentation of the spreadsheet structure). Channels of visualizations may include, for example, x-axis, y-axis, or color. For example, a column of a dataset may be bound to the x-axis of a bar chart.

The workbook element inspector 302 may include a mechanism to define and organize hierarchical relationships between the columns of the of a spreadsheet structure. The term "hierarchical relationship" refers to subordinate and superior groupings of columns. For example, a database may include rows for an address book, and columns for state, county, city, and street. A dataset from the database may be grouped first by state, then by county, and then by city. Accordingly, the state column would be at the highest level in the hierarchical relationship, the county column would be in the second level in the hierarchical relationship, and the city column would be at the lowest level in the hierarchical relationship.

The workbook element sources 304 presents the user with the primary and any secondary sources (such as datasets) for the selected workbook element. The workbook element sources 304 may also include a mechanism for a user to request and configure a dataset from a database to be presented as a workbook element in a workbook 300. Such a mechanism may be part of the interactivity of the workbook 300. Specifically, a user may manipulate a workbook (e.g., by dragging and dropping columns or rows, resorting columns or rows, manipulating a graph etc.) and, in response, the GUI 214 may generate a request (e.g., in the form of a state specification) for a dataset and send the request to the workbook manager. Such a mechanism may also include a direct identification of the rows and columns of a database table that a user would like to access (e.g., via a selection of the rows and columns in a dialog box). The GUI 214 may also include a mechanism for a user to create a new table on the database, add rows to a table, and move rows within the table.

Figure 4:
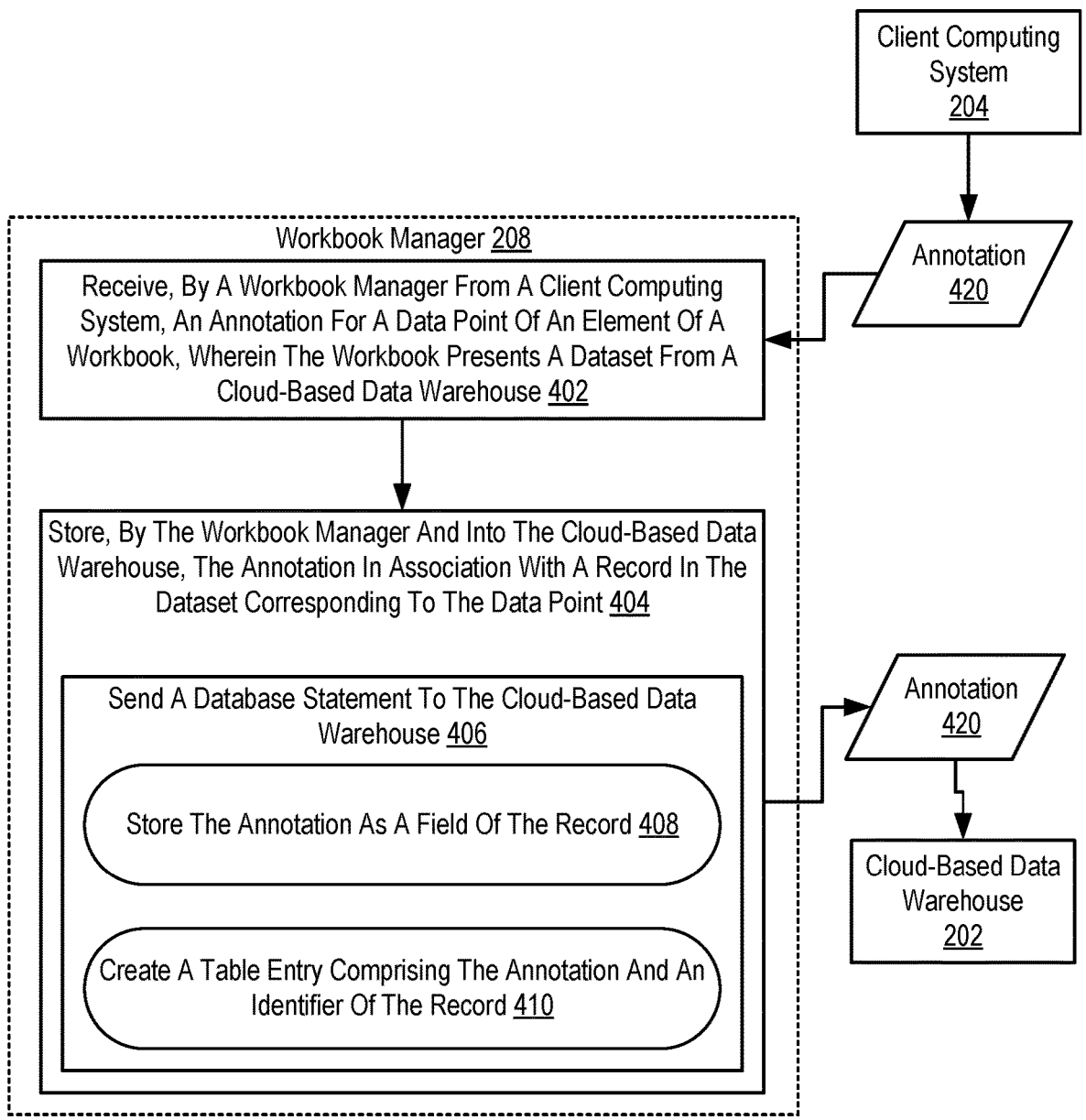
FIG. 4 sets forth a flow chart illustrating an exemplary method for annotating data points on a workbook element according to embodiments of the present invention.

For further explanation, FIG. 4 sets forth a flow chart illustrating an exemplary method for annotating data points on a workbook element according to embodiments of the present invention. The method of FIG. 4 includes receiving 402, by a workbook manager 208 from a client computing system 204, an annotation 420 for a data point of an element of a workbook, wherein the workbook presents a dataset from a cloud-based data warehouse 202. An annotation 420 is a user input comment, note, or description for a particular data point visualized by a workbook element. The annotation 420 may include, for example, a text input, a drawing or other visual note, or another comment, note, or description as can be appreciated. The annotation 420 is received via the workbook as presented on the client computing system 204 (e.g., via a workbook client 212 or another user interface). Annotations 420 serve to provide user-defined context to data described or visualized by the workbook element. For example, where the workbook presents some amount of data with respect to time, the annotation 420 may allow a user to describe particular events or other information with respect to particular points in time in the visualization. In some embodiments, the annotation 420 may also include metadata associated with the comment or note, including a user identifier for a user that input the annotation 420, a date and/or time of the annotation 420, an identifier for the workbook through which the annotation 420 is received, or other metadata as can be appreciated.

The annotation 420 for the workbook element may be input in response to a selection of a particular workbook element and a user interaction indicating that an annotation 420 is to be input. For example, a workbook element may be selected by a user and then a command, menu selection, or other input may be provided to the workbook to indicate that an annotation 420 is to be input. The workbook may then provide one or more user interface elements for inputting the annotation 420 by a user, such as a text input field, tools for drawing or writing visual notes, and the like.

The annotation 420 may be applied to a data point in the workbook element corresponding to a particular selected portion of the workbook element. For example, different portions of a graph or other visualization may correspond to different data points of a dataset presented or visualized by the workbook element. Accordingly, a particular portion of the workbook element (e.g., a particular portion of a graph or other visualization) may be selected such that the annotation 420 is applied to or otherwise associated with the corresponding data point (e.g., a corresponding record of the dataset). In some embodiments, user interface elements used to input the annotation 420 may be anchored or otherwise visually linked with the selected portion of the workbook element.

In some embodiments, one or more policies or permissions may control which users may provide annotations 420 via the workbook. In some embodiments, providing annotations 420 may be limited to particular users, users of particular groups or roles, and the like. In some embodiments, permissions for providing annotations 420 may be defined with respect to particular workbooks, groups of workbooks, datasets accessed or visualized by workbooks, and the like. The workbook manager 208 may verify that the user has permission (or is allowed by policy) to input the annotation into the workbook.

The method of FIG. 4 also includes storing 404, by the workbook manager 208 and into the cloud-based data warehouse 202, the annotation 420 in association with a record in the data set corresponding to the data point. Each data point presented or visualized by the workbook manager 208 may correspond to a different record in the dataset. Storing 404 the annotation 420 in association with the record in the dataset causes data encoding the annotation 420 to be stored in the cloud-based data warehouse 202 in some way that relates the annotation 420 to the record. In some embodiments, storing 404 the annotation 420 includes sending 406 a database statement to the cloud-based data warehouse that causes the annotation 420 to be stored in association with the record. Such a database statement may include a structured query language (SQL) statement or other database statement as can be appreciated.

The annotation 420 may be stored in the cloud-based data warehouse 202 in association with the record using a variety of approaches. In some embodiments, storing 404 the annotation 420 in association with the record may include storing 408 the annotation as a field of the record. For example, in some embodiments, the table in which the record is included may include a column for annotations 420. In some embodiments, the column may store strings for text annotations 420, strings for filenames or identifiers of drawn or visual annotations 420, binary data for visual annotations 420, and the like. In some embodiments, the column may potentially store multiple annotations 420 for the same record. For example, multiple text annotations 420 may be stored in the same string value using particular markups, delimiters, or other encodings used to denote multiple different text annotations 420. The annotation 420 for the record may then be stored as a value for this column. In some embodiments, where the table for the record does not include a column for annotations 420, a column for annotations 420 may be added by the workbook manager 208 to the table in response to a database statement or other command to store an annotation 420 in association with the record. In some embodiments, the column for annotations 420 may include a hidden column. A hidden column of a table is a column that is not returned in queries to the table unless explicitly requested or specified in the query. Thus, queries to the table including the record may not return annotations 420 unless explicitly requested in the query.

In some embodiments, rather than storing 408 the annotation 420 as a field of the record, storing 404 the annotation in association with the record may include creating 410 a table entry comprising the annotation 420 and an identifier of the record. The table entry may include an entry in a table that associates particular annotations 420 with their corresponding records in another table. Such a table may be specific to the table storing the record (e.g., only storing annotations 420 for the table including the record) or may store annotations 420 for records of multiple tables. The table entry may include a column for annotations 420 as described above. The table entry may also include a column for record identifiers. Thus, annotations 420 for particular records may be queried by using a JOIN operation on record identifiers for the table including the records and the table storing the annotations 420.

Storing 404 the annotation 420 in association with the record in the cloud-based data warehouse 202 enables various uses of the annotation 420. To begin, storing 404 the annotation 420 in the cloud-based data warehouse 202 allows the annotation 420 to persist across presentations of the workbook (e.g., across different sessions). As another example, as will be described in further detail below, subsequent presentations of the workbook that include the record may access the annotation 420 from the cloud-based data warehouse 202, allowing for the annotation 420 to also be presented in the workbook, including in presentations of the workbook requested by other users. Moreover, by associating the annotation 420 with a particular record rather than a particular workbook, the annotation 420 may be accessed by and presented in other workbooks, interfaces, and the like.

Annotating workbooks may be performed for a variety of purposes, particularly to provide user context to various data points presented in workbooks. Consider an example where a workbook presents, as a workbook element, a graph of quarterly profits over time. The graph may include a line graph where each quarterly profit data point is connected by line segments, a bar graph where each quarterly profit data point is represented by a bar in the bar graph, and the like. In this example, assume that, for a particular quarter, profit experienced a significant drop. This drop in quarterly profits will be visibly reflected in the graph.

The drop in quarterly profits may be the result of many possible events, each of which may be different indicators of overall business performance. For example, a drop in quarterly profits due to reduced revenue would indicate poor business performance, while a drop in quarterly profits due to increased investment of revenue into other areas may not indicate poor business performance. A user being presented with this workbook may wish to annotate the workbook at the point where the drop in quarterly profits is shown. The user may select an area of the graph corresponding to this drop (e.g., a particular bar in a bar graph or a particular data point in a line graph) and provide an annotation 420 explaining this drop in quarterly profits. Thus, subsequent presentations of the workbook to the user or other users may also present the provided annotation 420, providing additional context for this particular data point in the presented dataset.

Figure 5:
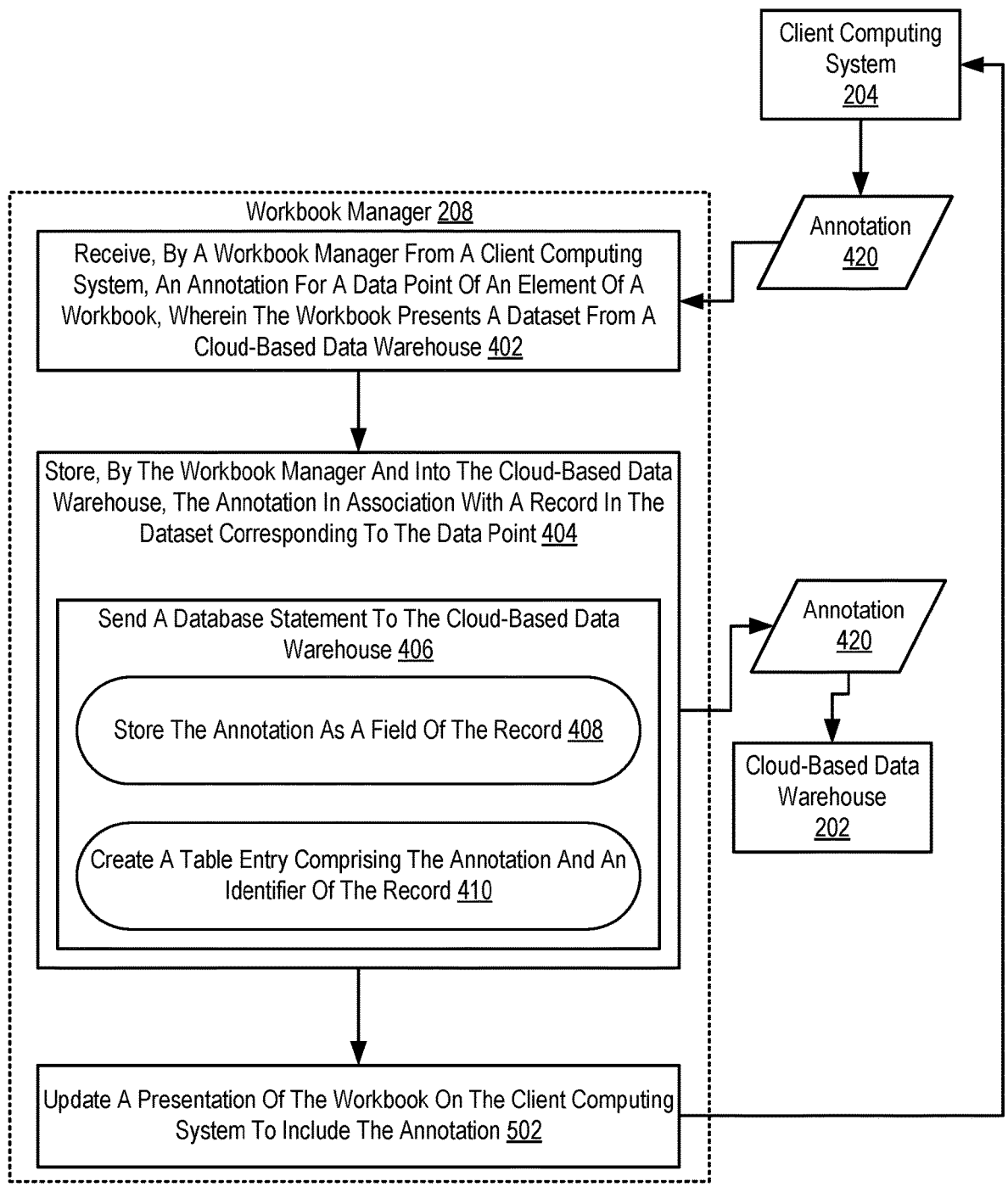
FIG. 5 sets forth a flow chart illustrating an exemplary method for annotating data points on a workbook element according to embodiments of the present invention.

For further explanation, FIG. 5 sets forth a flow chart illustrating a further exemplary method for annotating data points on a workbook element according to embodiments of the present invention that includes: receiving 402, by a workbook manager 208 from a client computing system 204, an annotation 420 for a data point of an element of a workbook, wherein the workbook presents a dataset from a cloud-based data warehouse 202; storing 404, by the workbook and into the cloud-based data warehouse 202, the annotation 420 in association with a record in the data set corresponding to the data point, including: sending 406 a database statement to the cloud-based data warehouse that causes the annotation 420 to be stored in association with the record; storing 408 the annotation as a field of the record; or creating 410 a table entry comprising the annotation 420 and an identifier of the record.

The method of FIG. 5 differs from the method of FIG. 4, however, in that the method of FIG. 5 further includes updating 502 a presentation of the workbook on the client computing system 204 to include the annotation 420. Updating 502 the presentation of the workbook to include the annotation 420 may include rendering a graphical user interface element or overlay displaying the annotation 420. In some embodiments, the rendered user interface element may be anchored to a point or area on a workbook element corresponding to the record with which the annotation 420 is associated. For example, a text box, bubble, or window presenting a text annotation 420 may be anchored to a portion of a workbook element corresponding to the associated record.

In some embodiments, updating 502 the presentation of the workbook to include the annotation 420 may be based on one or more configuration or display options for presenting annotations 420 in a workbook. Such configuration or display options may be specific to the workbook, to a user being presented with the workbook, and the like. For example, a selectable option to display or hide annotations 420 may control whether the presentation of the workbook will include the annotation 420. In some embodiments, user interface elements for displaying annotations (e.g., text bubbles, windows, and the like) may be hidden, minimized, or closed in order to control whether an annotation 420 is displayed. In some embodiments, where the workbook is accessed by multiple client computing systems 204, the presentation of the workbook on each client computing system 204 may be updated 502 to include the annotation 420. In some embodiments, whether annotations 420 are included in a presentation of a workbook may also be based on user permissions. For example, particular users, groups of users, roles of users, and the like may be selected as being able to view annotations 420 or prohibited from viewing annotations 420.

In some embodiments, a presentation of the workbook including the annotation 420 may include controls for editing or modifying the annotation 420. For example, a text bubble displaying the annotation 420 may display the annotation 420 in an editable text field. Modifications to the annotation 420 via the workbook may cause the annotation 420 to be updated in the cloud-based data warehouse 202. For example, a modification to the annotation 420 via the workbook may cause the workbook manager 208 to send a database statement to the cloud-based data warehouse 202 to update the annotation 420 as stored. As another example, an indication via the workbook to delete the annotation 420 may cause the workbook manager 208 to send a database statement to the cloud-based data warehouse 202 to delete the annotation 420 (e.g., by deleting or modifying a value storing the annotation 420 or deleting a table entry associating the annotation 420 with the record).

In some embodiments, modifications to annotations 420 may be controlled using various permissions. For example, in some embodiments, annotations 420 may only be modified or deleted by a user that created the annotations 420. As another example, in some embodiments, annotations 420 may be modified or deleted by users having particular roles, users that are members particular groups, or users having other allocated permissions for modifying or deleting annotations 420.

Figure 6:
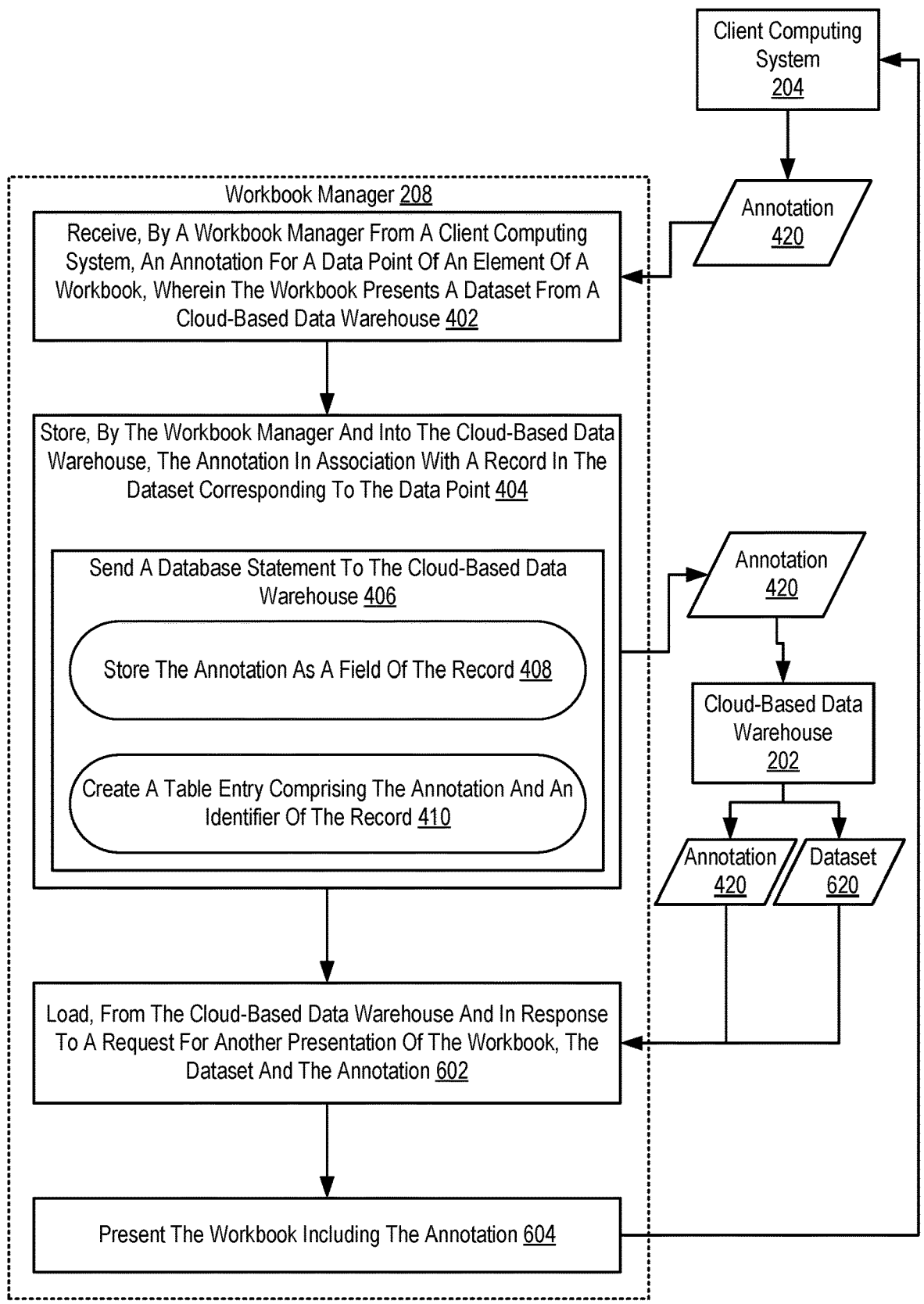
FIG. 6 sets forth a flow chart illustrating an exemplary method for annotating data points on a workbook element according to embodiments of the present invention.

For further explanation, FIG. 6 sets forth a flow chart illustrating a further exemplary method for annotating data points on a workbook element according to embodiments of the present invention that includes: receiving 402, by a workbook manager 208 from a client computing system 204, an annotation 420 for a data point of an element of a workbook, wherein the workbook presents a dataset from a cloud-based data warehouse 202; storing 404, by the workbook and into the cloud-based data warehouse 202, the annotation 420 in association with a record in the data set corresponding to the data point, including: sending 406 a database statement to the cloud-based data warehouse that causes the annotation 420 to be stored in association with the record; storing 408 the annotation as a field of the record; or creating 410 a table entry comprising the annotation 420 and an identifier of the record.

The method of FIG. 6 differs from the method of FIG. 4, however, in that the method of FIG. 6 further includes loading 602, from the cloud-based data warehouse 202 and in response to a request for another presentation of the workbook, the dataset 620 and the annotation 420. In some embodiments, the request for the other presentation may be received from the client computing system 204 from which the annotation 420 was received. For example, presentation of the workbook on the client computing system 204 may have been closed. A request for another presentation of the workbook may be subsequently received from the client computing system 204. In some embodiments, the request for the other presentation may be received from other client computing systems 204. For example, such other client computing systems 204 may request presentation of the workbook concurrent to the client computing system 204 that provided the annotation 420 or in a subsequent session.

In some embodiments, loading 602 the dataset 620 and the annotation 420 includes sending a database statement for the dataset 620 to the cloud-based data warehouse 202. For example, where the annotation 420 is stored as a column of the dataset 620, a database statement querying the cloud-based data warehouse 202 for the dataset 620 may cause the annotation 420 to be loaded by virtue of being included in the dataset 620. In some embodiments, where the annotation 420 is stored as a hidden column of the dataset, the database statement may indicate that the column storing the annotation 420 should be returned in response to the database statement.

In some embodiments, loading 602 the dataset 620 and the annotation 420 includes sending a database statement for the dataset 620 and the annotation 420 to the cloud-based data warehouse 202. For example, where the annotation 420 is stored in a table separate from the dataset 620, a database statement may be sent for the dataset 620 joined with the table storing the annotation 420. The response to the database statement will then include the dataset 620 with an appended column for the annotation 420 due to a JOIN operation.

The method of FIG. 6 also includes presenting 604 the workbook including the annotation 420. In other words, the presentation of the workbook will include both the dataset 620 and the annotation 420 loaded from the cloud-based data warehouse 202. Presenting 604 the workbook including the annotation 604 may be performed according to similar approaches as are described above with respect to updating 502 a presentation of the workbook to include the annotation 420. For example, user interface elements may be included in the workbook for displaying the annotation 420. As another example, various controls and/or permissions may be used to determine whether or not the annotation 420 is included in the presentation of the workbook.

In view of the explanations set forth above, readers will recognize that the benefits of annotating data points on a workbook element according to embodiments of the present invention include:

Improving the operation of the computer system by allowing for annotation of particular data points presented by a workbook, allowing for user-provided context to be combined with existing data, increasing system utility.

Exemplary embodiments of the present invention are described largely in the context of a fully functional computer system for annotating data points on a workbook element. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for annotating data points on a workbook element, the method comprising:
    receiving, by a workbook manager residing on a workbook manager computing system, from a client computing system, an annotation for a data point of an element of a workbook, wherein the workbook is a collection of graphical elements and organizing mechanism that presents a dataset from a cloud-based data warehouse, wherein the workbook manager computing system is an intermediary computing system between the client computing system and the cloud-based data warehouse; and
    storing, by the workbook manager and into the cloud-based data warehouse, the annotation in association with a record in the dataset corresponding to the data point, including creating a table entry in a table on the cloud-based data warehouse, wherein the table entry comprises the annotation and an identifier of the record, and wherein the table is separate from the dataset presented in the workbook.

2. The method of claim 1, wherein storing the annotation in association with the record in the dataset comprises sending a database statement to the cloud-based data warehouse.

3. The method of claim 1, further comprising updating, by the workbook manager, a presentation of the workbook on the client computing system to include the annotation.

4. The method of claim 1, further comprising:
    loading, from the cloud-based data warehouse and in response to a request for another presentation of the workbook, the dataset and the annotation; and
    presenting the workbook including the annotation.

5. The method of claim 1, wherein the data associating the annotation with the record in the dataset further associates the annotation with the workbook.

6. The method of claim 1, wherein the data associating the annotation with the record in the dataset is accessible via a plurality of workbooks.

7. The method of claim 1, wherein the element comprises a visualization element.

8. An apparatus for annotating data points on a workbook element, the apparatus comprising a computer processor, a computer memory operatively coupled to the computer processor, the computer memory having disposed within it computer program instructions that, when executed by the computer processor, cause the apparatus to carry out the steps of:
    receiving, by a workbook manager residing on a workbook manager computing system, from a client computing system, an annotation for a data point of an element of a workbook, wherein the workbook is a collection of graphical elements and organizing mechanism that presents a dataset from a cloud-based data warehouse, wherein the workbook manager computing system is an intermediary computing system between the client computing system and the cloud-based data warehouse; and
    storing, by the workbook manager and into the cloud-based data warehouse, the annotation in association with a record in the dataset corresponding to the data point, including creating a table entry in a table on the cloud-based data warehouse, wherein the table entry comprises the annotation and an identifier of the record, and wherein the table is separate from the dataset presented in the workbook.

9. The apparatus of claim 8, wherein storing the annotation in association with the record in the dataset comprises sending a database statement to the cloud-based data warehouse.

10. The apparatus of claim 8, wherein the computer program instructions further cause the apparatus to carry out the step of updating, by the workbook manager, a presentation of the workbook on the client computing system to include the annotation.

11. The apparatus of claim 10, wherein the computer program instructions further cause the apparatus to carry out the steps of:
    loading, from the cloud-based data warehouse and in response to a request for another presentation of the workbook, the dataset and the annotation; and
    presenting the workbook including the annotation.

12. The apparatus of claim 8, wherein the data associating the annotation with the record in the dataset further associates the annotation with the workbook.

13. The apparatus of claim 8, wherein the data associating the annotation with the record in the dataset is accessible via a plurality of workbooks.

14. The apparatus of claim 8, wherein the element comprises a visualization element.

15. A computer program product for annotating data points on a workbook element, the computer program product disposed upon a computer readable medium, the computer program product comprising computer program instructions that, when executed, cause a computer to carry out the steps of:
    receiving, by a workbook manager residing on a workbook manager computing system, from a client computing system, an annotation for a data point of an element of a workbook, wherein the workbook is a collection of graphical elements and organizing mechanism that presents a dataset from a cloud-based data warehouse, wherein the workbook manager computing system is an intermediary computing system between the client computing system and the cloud-based data warehouse; and
    storing, by the workbook manager and into the cloud-based data warehouse, the annotation in association with a record in the dataset corresponding to the data point, including creating a table entry in a table on the cloud-based data warehouse, wherein the table entry comprises the annotation and an identifier of the record, and wherein the table is separate from the dataset presented in the workbook.

* * * * *